US012120804B2

(12) United States Patent
Kuchler et al.

(10) Patent No.: US 12,120,804 B2
(45) Date of Patent: Oct. 15, 2024

(54) METHOD FOR OPERATING A DOMESTIC COOKING APPLIANCE AND DOMESTIC COOKING APPLIANCE

(71) Applicant: BSH Hausgeräte GmbH, Munich (DE)

(72) Inventors: Markus Kuchler, Gstadt am Chiemsee (DE); Kerstin Rigorth, Mühldorf (DE); Sebastian Sterz, Großaitingen (DE); Matthias Vogt, Obersulm (DE)

(73) Assignee: BSH Hausgeräte GmbH, Munich (DE)

( * ) Notice: Subject to any disclaimer, the term of this patent is extended or adjusted under 35 U.S.C. 154(b) by 780 days.

(21) Appl. No.: 17/287,547

(22) PCT Filed: Nov. 4, 2019

(86) PCT No.: PCT/EP2019/080108

§ 371 (c)(1),
(2) Date: Apr. 22, 2021

(87) PCT Pub. No.: WO2020/094573

PCT Pub. Date: May 14, 2020

(65) Prior Publication Data

US 2021/0385917 A1 Dec. 9, 2021

(30) Foreign Application Priority Data

Nov. 8, 2018 (DE) ..................... 10 2018 219 086.0

(51) Int. Cl.
*H05B 6/68* (2006.01)
*F24C 7/08* (2006.01)
(Continued)

(52) U.S. Cl.
CPC ............ *H05B 6/687* (2013.01); *F24C 7/087* (2013.01); *H05B 6/6455* (2013.01); *H05B 6/725* (2013.01)

(58) Field of Classification Search
CPC ...... H05B 6/687; H05B 6/6455; H05B 6/725; H05B 6/6447; H05B 6/645; F24C 7/087
See application file for complete search history.

(56) References Cited

U.S. PATENT DOCUMENTS 5,986,249 A 11/1999 Ahagon
9,414,444 B2 8/2016 Atzmony
(Continued)

FOREIGN PATENT DOCUMENTS

DE 102016202234 B3 5/2017
DE 102017101183 A1 * 7/2018 .......... H05B 1/0263

OTHER PUBLICATIONS

Machine translation of DE 102017101183 A1 performed on Feb. 9, 2024, Nieten et al. (Year: 2018).*
(Continued)

*Primary Examiner* — Dana Ross
*Assistant Examiner* — Kevin Guanhua Wen
(74) *Attorney, Agent, or Firm* — Michael E. Tschupp; Brandon G. Braun; Andre Pallapies

(57) ABSTRACT

In a method for treating food in a food handling device with a parameter configuration a measured value distribution of a surface property of the food is determined after expiration of the period of time by means of a sensor. A pattern of change is calculated from a comparison of the p-th measured value distribution with a measured value distribution determined previously. An assessment value Bq which represents a difference between a deviation of a target distribution from the measured value distribution and a deviation of the target distribution from a prediction pattern is calculated for all patterns of change stored hitherto. The prediction pattern is formed by superimposing the measured value distribution with the respective pattern of change, and the parameter
(Continued)

configuration is set for which the assessment value Bq meets at least one predetermined criterion.

19 Claims, 2 Drawing Sheets

(51) Int. Cl.
*H05B 6/64* (2006.01)
*H05B 6/72* (2006.01)

(56) References Cited

U.S. PATENT DOCUMENTS

2017/0290095 A1* 10/2017 Pereira et al. ........... H05B 1/02
2020/0178360 A1 6/2020 Rigorth

OTHER PUBLICATIONS

National Search Report DE 10 2018 219 086.0 dated Sep. 13, 2021.
International Search Report PCT/EP2019/080108 dated Feb. 6, 2020.

* cited by examiner

METHOD FOR OPERATING A DOMESTIC COOKING APPLIANCE AND DOMESTIC COOKING APPLIANCE

CROSS-REFERENCES TO RELATED APPLICATIONS

This application is the U.S. National Stage of International Application No. PCT/EP2019/080108, filed Nov. 4, 2019, which designated the United States and has been published as International Publication No. WO 2020/094573 A1 and which claims the priority of German Patent Application, Serial No. 10 2018 219 086.0, filed Nov. 8, 2018, pursuant to 35 U.S.C. 119 (a)-(d).

BACKGROUND OF THE INVENTION

The invention relates to a method for operating a household cooking appliance having a cooking chamber, at least one food handling device for handling food located in the cooking chamber with a plurality of parameter configurations, wherein the food is able to be handled locally differently by at least two parameter configurations, and at least one sensor which is directed into the cooking chamber for determining the distributions of a surface property of the food, wherein in the method at least one food handling device is operated in a p-th iteration step where p≥1 for a predetermined time period Δt with a q-th parameter configuration $S_q$, where q≤p, in order to handle food located in the cooking chamber and following the expiration of the time period Δt a p-th distribution $<V_p>$ of a surface property of the food is determined by means of the at least one sensor. The invention further relates to a household cooking appliance for carrying out the method. The invention is advantageously applicable, in particular, to microwave appliances.

US 2018/0098381 A1 and US 2017/0290095 A1 disclose a computer-implemented method for heating an object in a cooking chamber of an electronic oven to a target state. The method comprises the heating of the object with a set of energy applications relative to the cooking chamber, whilst the oven is in a specific configuration. The set of energy applications and the configuration define one respective set of variable energy distributions in the chamber. The method also comprises the detection of sensor data which define one respective set of responses of the food to the set of energy applications. The method also comprises the generation of a plan for heating the object in the chamber. The plan is generated by a control system of the oven and uses the sensor data.

WO 2012/109634 A1 discloses an apparatus for handling objects using HF energy. The apparatus may contain a display in order to display to a user an image of an object to be handled, wherein the image comprises at least one first part and one second part of the object. The apparatus may also comprise an input unit and at least one processor which is configured for: receiving information based on an input which is provided to the input unit, and for generating processing information for use when treating the object, based on the received information, in order to achieve a first processing result in the first portion of the object and a second processing result in the second portion of the object.

BRIEF SUMMARY OF THE INVENTION

It is the object of the present invention to remedy at least partially the drawbacks of the prior art and, in particular, to provide the possibility of automatically handling food to a desired surface property, which may be implemented in a particularly simple and effective manner.

This object is achieved according to the features of the independent claims. Advantageous embodiments form the subject of the dependent claims, the description and the drawings.

The object is achieved by a method for operating a household cooking appliance, having a cooking chamber, at least one food handling device for handling food located in the cooking chamber with a plurality of parameter configurations, wherein the food is able to be handled locally differently by at least two parameter configurations, and at least one sensor which is directed into the cooking chamber for determining distributions $<V>$ of a surface property of the food, wherein in the method a) at least one food handling device is operated in a p-th iteration step where p≥1 for a predetermined time period Δt with a q-th parameter configuration $S_q$ where q≤p, in order to handle food located in the cooking chamber, b) following the expiration of the time period Δt, a p-th distribution $<V_p>$ of a surface property of the food is determined or measured by means of the at least one sensor, c) a pattern of change $<E(S_q)>$ is calculated and stored from a comparison of the p-th distribution $<V_p>$ with a (p−1)-th distribution $<V_{p-1}>$ recorded before step a), d) for all patterns of change $\{<E(S_q)>\}$ stored hitherto, a respective assessment value $B_q$ is calculated which combines the p-th distribution $<V_p>$ with the respective pattern of change $<E(S_q)>$ to form a prediction pattern $<V'_p>$ and represents a value of a deviation of the prediction pattern $<V'_p>$ with a target distribution $<Z>$ for the food, e) the parameter configuration $S_q$ of which the assessment value $B_q$ meets at least one predetermined criterion is set f) a quality value $Q_p$ is calculated for the p-th distribution $<V_p>$ which specifies a deviation of the distribution $<V_p>$ from a target distribution $<Z>$, and g) if a sufficiently smaller deviation from the target distribution $<Z>$ results for the quality value $Q_p$ than for the (p−1)-th quality value $Q_{p-1}$, an iterative branching is carried out to step a) whilst maintaining the current parameter configuration $S_q$, and h) if an insufficiently smaller deviation from the target distribution $<Z>$ results for the quality value $Q_p$ than for the $Q_p$, a new parameter configuration $S_{q+1}$ is set and then an iterative branching is carried out to step a).

This method results in the advantage that it is able to handle the food effectively and rapidly such that the food contains a desired surface property corresponding to the target distribution.

In particular, the method permits a targeted control of a heating distribution of food when using microwaves and/or HF radiation with the assistance of the data from a sensor. Thus it is possible to implement with little effort an intelligent control of a cooking appliance, which is able to achieve the best possible cooking result dynamically and only relative to the current moment. In particular, the associated computing effort is low, so that the iteration steps of the method may be carried out particularly rapidly. Furthermore, no memory is required for storing large quantities of data. Thus specific temperature patterns and distributions may also be set in conventional cooking appliances and namely merely with the assistance of a simple sensor.

The surface property may be, for example, a temperature measured on the surface of the food, a moisture level or a degree of browning but is not limited thereto. The distribution <$V_p$> is hereinafter also denoted as the "measured value distribution" and represents an actual distribution of the food measured during an iteration p. Depending on the type of measured surface property, the distribution may be denoted as the temperature distribution, the degree of browning distribution, etc. The target distribution <Z> may be denoted in a similar manner and, in particular, is dimensionless.

A parameter configuration $S_q$ generally corresponds to a specific value range which is drawn up by the corresponding setting or operating parameters. In other words a parameter configuration $S_q$ corresponds to a specific q-th set of setting or operating values of the household cooking appliance. A parameter configuration $S_q$ comprises at least two possible setting values of at least one setting or operating parameter of the household cooking appliance. In this case, each operating parameter may adopt at least two values or states. In the simplest case, these two states may be "on" and "off". As at least two parameter configurations handle the food locally differently, this results in a variable distribution of the surface property, with a corresponding effect on the food by the two parameter configurations.

The household cooking appliance may be a microwave appliance, wherein the food handling device thus has at least one microwave device for introducing microwaves into the cooking chamber. The microwave device has, in particular, at least one microwave generator (for example a magnetron, an inverter-controlled microwave generator, a solid state-based microwave generator ("solid state microwave generator"), etc.) For example, the operating frequency and, in the case of a plurality of microwave generators and/or feed points, the relative phase thereof, etc. may be used as the setting or operating parameters of the microwave generator which change a field distribution in the cooking chamber (in particular in the case of the microwave power being generated on the basis of semi-conductors).

The microwave device may also have a microwave guide for guiding the microwaves generated by the microwave generator into the cooking chamber. The microwave guide may be or may have, for example, a waveguide or an HF cable.

The microwave device may also have at least one settable field changing component, i.e. a field distribution of the microwaves in the cooking chamber is variable according to the position of the field changing component. Depending on the setting of the setting or operating parameters of these field changing components, a specific field distribution and thus a specific heating pattern or pattern of change is set in the food.

The at least one field changing component may have or may be, for example, at least one rotatable antenna which couples microwave energy into the cooking chamber, for example from the microwave guide. These rotating antennae are typically not shaped rotationally symmetrically so that an angular position may be specified therefor as the setting or operating parameter and which, for example, may be set in a targeted manner via a stepper motor. In one development the at least one rotatable antenna may also be set relative to its vertical position.

The at least one field changing component may additionally or alternatively have at least one microwave reflector which may be set relative to its spatial position. The microwave reflector may be rotatable and/or displaceable. A rotatable microwave reflector may be configured as a mode stirrer ("wobbler"). A displaceable microwave reflector may be configured as a spatially displaceable dielectric (for example made of Teflon).

If the at least one food handling device has or comprises a microwave device, the at least one setting or operating parameter may thus comprise at least one operating parameter from the group

- respective rotational angle of at least one rotatable antenna;
- respective vertical position of at least one rotatable antenna;
- spatial position of at least one microwave reflector;
- microwave frequency;
- relative phases between different microwave generators.

This does not exclude that further operating parameters of the microwave device which are able to change the field distribution may also be set.

If the household cooking appliance is a microwave appliance and the relevant surface property is a temperature, the method may also be expressed such that

- the at least one food handling device comprises a microwave device for introducing microwaves into the cooking chamber, wherein by at least two parameter configurations of the microwave device different field distributions of the microwaves may be generated in the cooking chamber,
- the surface property is a surface temperature of the food and
- the at least one sensor comprises at least one infrared sensor which is directed into
- the cooking chamber for determining measured value distributions <V> on the food, wherein in the method a) the microwave device is operated in a p-th iteration step where $p \geq 1$ for a predetermined time period $\Delta t$ with a q-th parameter configuration $S_q$ where $q \leq p$, in order to treat food (G) located in the cooking chamber (2) with microwaves, b) following the expiration of the time period $\Delta t$ a p-th measured value distribution <$V_p$> of the food is determined by means of the at least one infrared sensor, c) a pattern of change <E($S_q$)> is calculated and stored from a comparison of the p-th measured value distribution <$V_p$> with a (p−1)-th measured value distribution <$V_{p-1}$> recorded before step a), d) for all patterns of change {<E($S_q$)>} stored hitherto in the course of said method, a respective assessment value $B_q$ is calculated which represents a difference between a deviation of a target distribution <Z> from the measured value distribution <$V_p$> and a deviation of the target distribution <Z> from a prediction pattern <$V'_p$>, wherein the prediction pattern <$V'_p$> forms a superimposition of the measured value distribution <$V_p$> with the respective pattern of change <E($S_q$)>, e) the parameter configuration $S_q$ of which the assessment value $B_q$ meets at least one predetermined criterion is set f) a quality value $Q_p$ is calculated for the p-th measured value distribution <$V_p$> which specifies a deviation of the measured value distribution <$V_p$> from a target measured value distribution <Z>, and g) if a sufficiently smaller deviation from the target distribution <Z> results for the quality value $Q_p$ than for the (p−1)-th quality value $Q_{p-1}$, an iterative branching is carried out to step a), whilst maintaining the current parameter configuration $S_q$, and h) if an insufficiently smaller deviation from the target measured value distribution <Z> results for the quality value $Q_p$ than for the $Q_p$, a new parameter configuration $S_{q+1}$ is set and then an iterative branching is carried out to step a).

The household cooking appliance, however, may also be an oven, wherein the food handling device thus has at least one—in particular electrically operated—radiant element for introducing heat radiation into the cooking chamber, for example at least one bottom heat-heating element, at least one top heat-heating element and/or at least one grill heating element.

In one development, in the case of an oven, the at least one food handling unit comprises at least one food handling unit from the group having at least one electrical radiant element, at least one induction coil, at least one jet-directed cool air fan, at least one jet-directed hot air device and/or at least one jet-directed water feed device.

Thus the advantage is achieved that the surface property may be standardized with a plurality of apparatuses (if present in the household cooking appliance) individually or in any combination or may be set to a different target distribution of the surface property. This in turn increases an effectiveness of the method. A jet-directed apparatus may be understood to mean, in particular, a substance introduction unit which is designed to introduce at least one locally defined, directed flow of a substance into the cooking chamber for local handling of the food.

The at least one electrical radiant element serves for heating the cooking chamber and/or the food present in the cooking chamber. Said radiant element may be one respective tubular heating element, alternatively or additionally, for example, a printed conductor track, a resistance surface heating element, etc. If the household cooking appliance is provided with at least one electrical radiant element, the cooking chamber may also be denoted as the oven chamber.

The at least one radiant element may comprise, for example, at least one bottom heat-heating element for generating a bottom heat or bottom heating function, at least one top heat-heating element for generating a top heat or top heating function, at least one grill heating element for generating a grill function (optionally together with the at least one top heat-heating element), a ring heating element for generating a hot air or hot air function, etc. The setting or operating parameter of a radiant element may comprise, in particular, different electrical powers or power levels, for example <0 W, 200 W, . . . , 800 W>.

In one embodiment, the at least one electrical radiant element comprises at least two radiant elements and the parameter configuration comprises setting values for at least two of the radiant elements. In other words, different power distributions which correspond to different sets of setting parameters of at least two radiant elements may be used for carrying out the method.

In one development, the radiant elements may be operated separately or individually and namely, in particular, irrespective of whether a plurality of radiant elements are to be operated together when selecting a specific operating mode (for example grill operating mode). This results in the advantage that it is possible to provide power distributions which are particularly well adapted to achieving a desired distribution of the surface property.

In one development, the radiant elements are able to be activated (in particular only) as functional "operating mode" groups or heating types which are assigned to specific operating modes. In this case, in a variant with at least one operating mode, just one radiant element may be activated and/or just one radiant element may be assigned to this operating mode. In at least one further operating mode, at least two radiant elements may be activated and/or at least two radiant elements may be assigned to this further operating mode. The local power distributions predetermined for comparison in step b) may thus result from the power inputs of radiant elements assigned to different operating modes.

The household cooking appliance may also be a combination of an oven and microwave appliance, for example an oven with an additional microwave functionality or a microwave appliance with an additional oven function, wherein the combination appliance thus has at least one microwave device and at least one radiant element.

In one embodiment, the at least one sensor comprises at least one infrared sensor and/or at least one optical sensor. Thus a surface property may be particularly reliably determined and effectively evaluated. The optical sensor is particularly suitable for determining a degree of browning and/or determining the moisture level on the surface of the food, whilst the infrared sensor is particularly suitable for determining a temperature distribution on the surface of the food. The infrared sensor is sensitive, in particular, in a near infrared range (NAR).

Thus in one development, a spatially resolved, in particular pixel-based, measured value distribution <V> of the surface property of the food is provided from the measured values of the at least one sensor, in particular as a two-dimensional image. To this end, at least one sensor may be a sensor which carries out measurements with spatial resolution. This advantageously permits the method to be carried out particularly rapidly.

In one development, the at least one optical sensor comprises or is a camera which records a pixel-based composite image of the food. The camera—in particular a digital camera—is advantageously a color camera but may also be a black and white camera.

In one embodiment, the at least one infrared sensor comprises at least one IR camera with a pixel-based resolution for recording at least one pixel-based thermal image (also denoted as a thermal imaging camera).

Alternatively or additionally, at least one sensor may be moved relative to the food (for example by being fastened to a movable support) and measurements carried out at different spatial positions which are combined to form an overall image. Thus the advantage is achieved that, in particular, even the surface of food which is bulky or not flat may be detected or measured more thoroughly. Alternatively or additionally, it is also possible to use a plurality of sensors which are directed from different viewing angles and/or at different positions into the cooking chamber, the measurements thereof being able to be combined together, for example, to form an overall image. The at least one infrared sensor may thus be configured, for example, as at least one so-called "thermopile", etc. The at least one infrared sensor may also be configured as an IR spectroscope.

Additionally or alternatively, the food may be moved in order to measure the surface property(properties) thereof. For example, the food may be placed on a turntable. Additionally or alternatively, the food may be height-adjustable in the cooking chamber, for example by means of a holder which is height-adjustable—in particular by motor—for a food support or by a height-adjustable food support. The height adjustment of the food is carried out, in particular, automatically by the household cooking appliance.

In one embodiment, for determining the measured value distribution <V> of the food, the measured value distribution <V> thereof is isolated in the thermal image, i.e. only the measured value distribution of food is considered for the method, whilst the surface property of the surroundings of the food (for example of a food support, of cooking chamber walls, etc.) are ignored or removed. In other words, measured values of the surface of the food are separated from measured values of other surfaces or image regions. In order to achieve this, for example, an image recorded by the sensor may be subjected to an image analysis, in particular object recognition. This permits a particularly accurate, automatic determination of the position of the food in the cooking chamber.

The surface of the food in the cooking chamber may alternatively or additionally be determined by an evaluation of thermal changes at the start of the cooking process. Thus the surface of the food will be generally heated more slowly than a typically metal food support, which is able to be identified and evaluated, for example, in a thermal image sequence. Alternatively or additionally, chronological changes in the wavelength-dependent reflection may be evaluated.

Alternatively, the position of the food in the cooking chamber may be determined in a different manner, for example by the user. For example, in one development an optical image of the cooking chamber may be recorded and provided to a user for viewing, for example on a touch-sensitive screen, for example of the household cooking appliance and/or a user terminal, such as a smartphone or tablet PC. The user may thus determine the image surface which corresponds to the food. This may be carried out, for example, by passing along the contour of the food identified by the user by means of a finger or pen on the touch-sensitive screen. Alternatively, the recorded image may be divided into image sub-regions and a user may select those sub-regions on which the food is shown, in particular on which the food is substantially shown, in particular on which only the food is shown. As a result, the household cooking appliance may only use the segments selected by the user for carrying out the method.

The pattern of change <E($S_q$)> is a function of the measured value distribution <$V_p$> recorded in the p-th iteration step and the measured value distribution <$V_{p-1}$> recorded in the previous (p−1)-th iteration step, which may also be expressed as <E>=f(<$V_p$>, <$V_{p-1}$>), wherein the measured value distributions <$V_p$> and <$V_{p-1}$> in turn are based on the respective parameter configurations $S_q$ which may be the same or different. The comparison may, in particular, be a general difference.

If the surface property is a temperature, the pattern of change <E($S_q$)> maps the temperature increase which results with a specific parameter configuration $S_q$ and may be determined by the temperature distributions for the iteration steps (p−1) and p being compared with one another.

Additionally for all patterns of change {<E($S_q$)>} stored hitherto in the course of said method, a respective assessment value $B_q$ is calculated which represents a difference between a deviation of a target distribution <Z> from the measured value distribution <$V_p$> and a deviation of the target distribution <Z> from a prediction pattern <$V'_p$>, wherein the prediction pattern <$V'_p$> forms a superimposition of the measured value distribution <$V_p$> with the respective pattern of change <E($S_q$)>. The prediction pattern <$V'_p$> corresponds to the measured value distribution which might arise if the pattern of change <E($S_q$)> were to be applied to <$V_p$>.

The assessment value $B_q$ in turn specifies the degree to which an application of the associated pattern of change <E($S_q$)> relative to the current measured value distribution <$V_p$> is likely to bring this measured value distribution <$V_p$> closer to the target distribution <Z>. As a result, the advantage is achieved that the effect on the next iteration step of setting the available parameter configurations $S_q$ may be estimated in a simple manner.

The fact that the parameter configuration ($S_q$) of which the assessment value $B_q$ meets at least one predetermined criterion is set, means that just one such assessment value $B_q$ is produced, namely the assessment value $B_q$ whose application in the next iteration step is likely to be closest to the target distribution <Z>.

Step g) is carried out in the case where the p-th measured value distribution <$V_p$> is better adapted to the target distribution <Z> than the previous (p−1)-th measured value distribution <$V_{p-1}$>, i.e. has caused an improvement of the actual distribution <V> toward reaching the target distribution <Z>. In one development, a "sufficiently small deviation" may be understood to mean a deviation in which a sufficiently smaller deviation from the target distribution <Z> results for the quality value $Q_p$ than for the (p−1)-th quality value $Q_{p-1}$. Step h) is then carried out in the case where an insufficiently smaller deviation from the target distribution <Z> results for the quality value $Q_p$ than for the quality value $Q_{p-1}$.

Step h) is then carried out in the case where the p-th measured value distribution <$V_p$> is less well adapted to the target distribution <Z> than the previous measured value distribution <$V_{p-1}$>, i.e. has caused a deterioration of the actual distribution, although for the underlying parameter configurations $S_q$, according to their assessment value $B_q$, probably the best result of all of the previously set parameter configurations $S_q$ was to be expected. As a way out of this situation a new parameter configuration $S_{q+1}$ which has not yet been previously used is now selected and set. The supply of parameter configurations {$S_q$} for carrying out the method is thus successively increased and oriented as required. Whether the new parameter configurations $S_{q+1}$ results in an improved measured value distribution <$V_{p+1}$> than the previous measured value distribution <$V_p$>, however, is not known.

In a further development, a "sufficiently small deviation" may also be understood to mean a deviation in which a sufficiently smaller deviation from the target distribution <Z> results for the quality value $Q_p$ than for the (p−1)-th quality value $Q_{p-1}$ or in which the improvement of the p-th measured value distribution <$V_p$> relative to the previous measured value distribution <$V_{p-1}$> reaches or exceeds a predetermined minimum value. This may be expressed such that $Q_p \geq a \cdot Q_{p-1}$ where a>1 has to apply if a larger Q means a better correspondence. The predetermined factor a may also be denoted as the "minimum improvement". If a smaller Q means an improved correspondence, the condition may be formulated as $Q_p \leq a \cdot Q_{p-1}$ where a<1.

Step h) is then carried out in the case where the improvement of the p-th measured value distribution <$V_p$> has not been sufficiently high relative to the previous measured value distribution <$V_{p-1}$>. In this case, therefore, a new parameter configuration $S_{q+1}$ is then selected or set when $Q_p \geq a \cdot Q_{p-1}$ where a>1 applies, although $Q_p > Q_{p-1}$ may be fulfilled.

In the next iteration step, therefore, an existing parameter configuration $S_q$ using the assessment value $B_q$ is again selected from the increased supply of parameter configurations $\{S_q\}$, except the last added ("newest") parameter configuration $S_q$ is selected again, although no improvement was observed.

In one embodiment, in step h) new parameter configurations $S_{q+1}$ are set until an (in particular sufficiently great) improvement of the measured value distribution <V> occurs in the newest parameter configuration $S_q$. In the present method, therefore, it is possible that the result of the food handling may remain practically the same or may even deteriorate for at least one iteration step.

In one development, the measured value distribution $<V_p>$ is a segmented measured value distribution such that it has different sub-regions with respectively consistent measured values. For example, the image recorded by a camera may be divided into image segments of a specific edge length or specific number of pixels. The value represented by a segment is a constant measured value for this segment and may be determined, for example, by averaging the pixel values contained in the respective segment. In an extreme case, the segments correspond to individual pixels, i.e. the measured value distribution of the food used for carrying out the method is a pixel-based temperature distribution. In one embodiment, the (actual) measured value distribution $<V_p>$, the target distribution <Z> and the pattern of change $<E(S_q)>$ are segmented distributions with in each case k segments.

In one development, the method is terminated if at least one predetermined termination criterion is fulfilled. The termination criterion may be dependent, in particular, on the last-recorded measured value distribution $<V_p>$.

In one embodiment, the method is terminated if the quality value $Q_p$ reaches a predetermined criterion and/or the food reaches a predetermined target value ($V_{target}$). Thus the food which has been fully treated may be brought closer to a desired end state in a particularly reliable manner.

In one embodiment, the criterion of the quality value $Q_p$ comprises reaching a target quality value $Q_{target}$. With the assumption that a measured value distribution $<V_p>$ is brought closer to the target distribution <Z> the lower the value of $Q_p$, the termination criterion may be fulfilled, for example, when $Q_p \leq Q_{target}$ applies. This criterion thus may be advantageously used when the method is to be terminated when the measured value distribution $<V_p>$ is sufficiently close to the target distribution <Z>.

If the criterion comprises that the food reaches a predetermined target value $V_{target}$, this target value may be compared with the measured value distribution $<V_p>$, but this does not have to be the case. Thus the criterion may also comprise, for example, reaching a cooking time period, core temperature, etc. predetermined by a user or program.

In one embodiment, the food has reached the predetermined target value $V_{target}$ if max $(<V_p>) \geq V_{target}$ or min $(<V_p>) \geq V_{target}$ is fulfilled. Thus different desired end states of the food may be achieved in a particularly reliable manner. The criterion max $(<V_p>) \geq V_{target}$ specifies, for example, that the method is to be terminated when only one segment has reached the target value $V_{target}$. Thus a handling of the food which is too rapid or too slow may be advantageously prevented. The criterion min $(<V_p>) \geq V_{target}$ specifies that the method is to be terminated when all of the segments have reached the target value $V_{target}$. Thus a non-continuous handling of the food may be advantageously prevented.

In one embodiment, the pattern of change $<E(S_q)>$ is calculated in segments as the difference between the p-th measured value distribution $<V_p>$ and the (p−1)-th distribution $<V_{p-1}>$, in particular according to $$<E(S_q)>=<V_p>-<V_{p-1}>$$

and/or relative to the i-th segment according to $$E(S_q)_i=V_{p,i}-V_{(p-1),i}$$

The pattern of change $<E(S_q)>$ represents the effect of handling the food when setting the parameter configuration $S_q$. The pattern of change $<E(S_q)>$ may also be denoted as the change distribution.

In one embodiment, the assessment value $B_q=B(S_q)$ is calculated according to $$B_q=\Sigma(|<Z^*>-<V_p>|^d-|<Z^*>-<V'_p>|^d)$$

and/or where i=1, . . . , k segments $$B_q=\sum_{i=1}^{k}(|Z_i^*-V_{p,i}|^d-|Z_i^*-V'_{p,i}|^d)$$

wherein the prediction pattern $<V'_p>$ may be calculated, for example, according to $$<V'_p>=<V_p>+<E(S_q)>$$

and the exponential factor d is predetermined. $<E(S_q)>$, $<V'_p>$ and $<V_p>$ may have hereinafter absolute temperatures as components and thus, in particular, are not—for example standardized—relative distributions.

<Z*> denotes the target distribution relative to the current measured value distribution $<V_p>$ and to the average value D of the k components of $<V_p>$ derived therefrom where $$D=\emptyset(<V_p>)=\frac{1}{k}\sum_{i=1}^{k}V_{p,i}$$

is desired as the current target state by considering temperature values ("target measured value distribution"). D is, in particular, a temperature specified in ° C. Whilst the target distribution <Z> is dimensionless, <Z*> is implemented in ° C.

Thus the target measured value distribution <Z*> may be defined in terms of components for all Z*, according to $$Z^*_1=D^*Z_i$$

which may also be written as <Z*>=D·<Z>. The exponential factor d specifies how extensively deviations from the target distribution <Z> are to be considered. Where d>1 the assessment value $B_q$ prefers heating patterns $<E(S_q)>$ which compensate for the large differences in the actual measured value distribution $<V_p>$ from the target distribution <Z>.

Depending on the food to be handled, an individual selection of d may be advantageous. In particular, therefore, a differentiation may be made between food to be heated quickly with lower thermal capacity (for example, popcorn) or food with higher thermal capacity and correspondingly more sluggish response behavior (for example a larger roasted joint of meat).

The prediction pattern $<V'_p>$, however, may also be calculated in a different manner, for example by the weighted addition of the pattern of change $<E(S_q)>$ with the measured value distribution $<V_p>$.

In one embodiment, the quality value $Q_p$ is calculated according to $$Q_p=\sqrt{\frac{1}{k}\Sigma(D\cdot<Z>-<V_p>)^2}=\sqrt{\frac{1}{k}\sum_{i=1}^{k}(D\cdot Z_i-V_{p,i})^2}$$

In the case of $Z_i=1$ for all i, i.e. a uniform target distribution <Z>, $Q_p$ corresponds to the standard deviation. $Q_p$ thus may also be denoted as "modified standard deviation" and applies as a measure of how similar the actual measured value distribution $<V_p>$ is to the target measured value distribution $<Z^*>=D\cdot<Z>$.

Similarly a standardized modified standard deviation $Q_{p,norm}$ may be introduced. This has the advantage, in particular, that it specifies the similarity of the actual measured value distribution $<V_p>$ to the target measured value distribution $<Z^*>=D\cdot<Z>$ irrespective of absolute temperatures and is always in the value range of 0 to 1.

To this end, all k components are standardized from $<V_p>$ to the maximum value $V_{max}=\max\{V_{p,i}\}$, whereby $<V_{p\_norm}>$ is determined in terms of components:

$$V_{p\_norm,i} = \frac{V_{p,i}}{V_{max}}$$

In a similar manner to $Q_p$, $Q_{p\_norm}$ may be defined according to:

$$Q_{p\_norm} = \sqrt{\frac{1}{k}\Sigma(<Z>-<V_{p\_norm}>)^2} = \sqrt{\frac{1}{k}\sum_{i=1}^{k}(Z_i - V_{p\_norm,i})^2}$$

Hereinafter $Q_{p\_norm}$ and $Q_p$ are used synonymously. Generally the method may be carried out equally with standardized values or variables and with non-standardized values or variables.

The object is further achieved by a household cooking appliance which is designed for carrying out the method as described above. The household cooking appliance may be configured similarly to the method and has the same advantages.

One embodiment has at least one food handling device for handling food located in the cooking chamber with a plurality of parameter configurations, wherein the food is able to be handled locally differently by at least two parameter configurations, and at least one sensor which is directed into the cooking chamber for determining distributions <V> of a surface property of the food, and a data processing device for carrying out the method.

BRIEF DESCRIPTION OF THE DRAWINGS

The above-described properties, features and advantages of this invention and the manner in which they are achieved are understood more clearly and explicitly in connection with the following schematic description of an exemplary embodiment which is described in more detail in connection with the drawings.

DETAILED DESCRIPTION OF EXEMPLARY EMBODIMENTS OF THE PRESENT INVENTION

Figure 1:
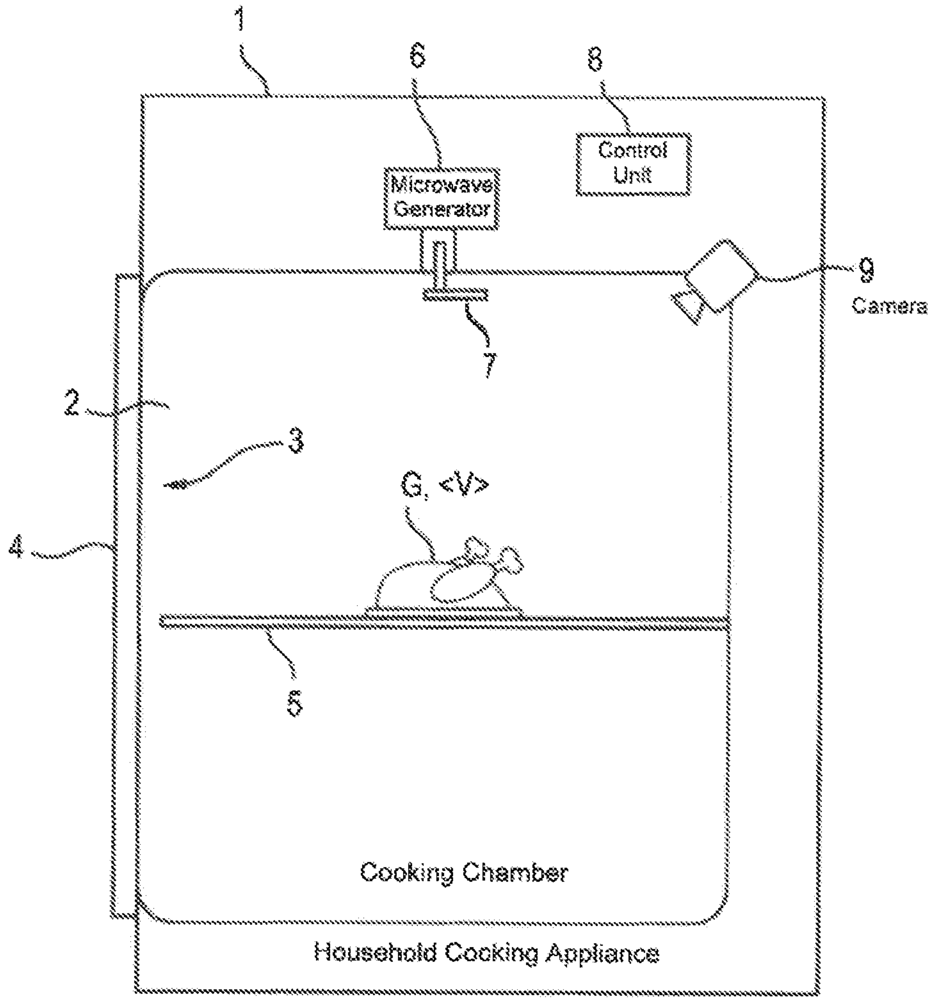
FIG. 1 shows a simplified sketch of a household cooking appliance which is designed for carrying out the above-described method.
Figure 2:
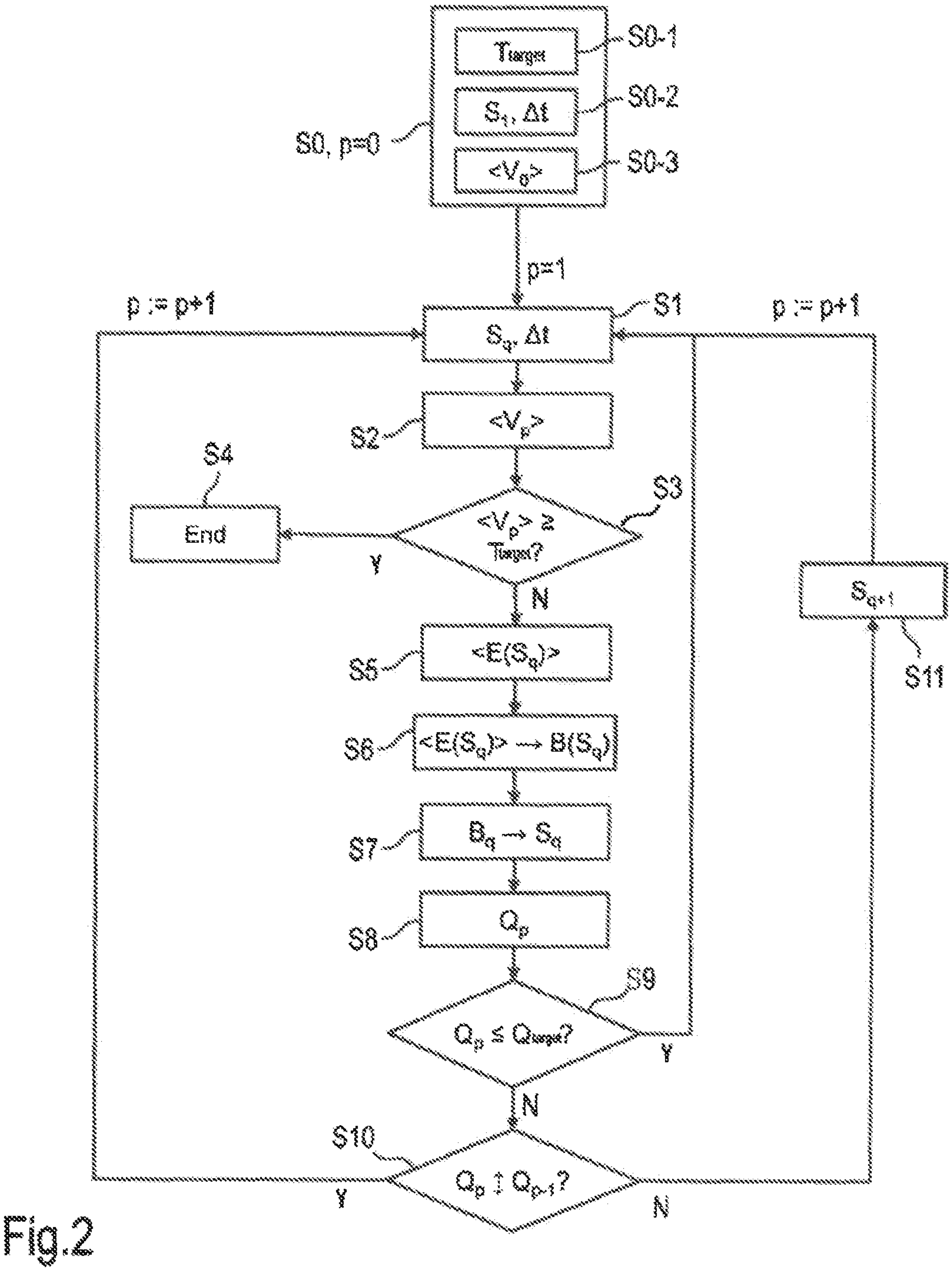
FIG. 2 shows different steps of the above-described method.

FIG. 1 shows as a sectional side view a sketch of a household cooking appliance in the form of a microwave appliance 1 which is designed for the execution of the method described in more detail in FIG. 2. The microwave appliance 1 has a cooking chamber 2 with a front-side loading opening 3 which is closable by means of a door 4. Food G is arranged on a food support 5 in the cooking chamber 2.

The household cooking appliance 1 also has at least one food handling unit in the form of a microwave generating device 6. The microwave generating device 6, for example, may be an inverter-controlled microwave generator, a rotatable and/or height-adjustable rotating antenna 7 and/or a rotatable and/or height-adjustable wobbler (not shown). Additionally the microwave appliance 1 may have infrared radiant elements (not shown), for example a bottom heat-heating element, a top heat-heating element and/or a grill heating element.

The microwave generating device 6 is activated by means of a control unit 8. In particular, the microwave generating device 6 may be set to at least two parameter configurations $S_q$ with different field distributions in the cooking chamber 2. Different parameter configurations may correspond, for example, to different rotational angles of the rotating antenna 7. The rotational angle thus corresponds to a field-varying setting or operating parameter of the microwave appliance 1 with at least two setting values in the form of rotational angle values.

The control unit 8 is additionally connected to an optical sensor in the form of a thermal imaging camera 9. The thermal imaging camera 9 is arranged such that it is directed into the cooking chamber 2 and may record a pixel-based thermal image of the food G. As a result, the thermal imaging camera 9 may be used for recording or determining a temperature distribution <V> on the surface of the food G.

The control unit 8 may additionally be designed to carry out the above-described method and may also serve as an evaluation device. Alternatively, the evaluation may run on an entity which is external to the appliance, such as a network computer or the so-called "cloud" (not shown).

FIG. 2 shows different steps of the above-described method, which may be executed, for example, in the microwave appliance 1 described in FIG. 1. This method is configured as an iteration method, wherein the number of iterations is specified by the step or iteration index p.

After introducing the food G into the cooking chamber 2 the method is started and firstly a starting or initial step S0 is carried out. This initial step S0 may be assigned an iteration index p=0.

In a first partial step S0-1 of the initial step S0, a target temperature $T_{target}$ is set for the food G.

Subsequently in a partial step S0-2 a first parameter configuration $S_q=S_1$ for the rotating antenna 7 is set and then the food G is handled for a predetermined time period Δt (for example between 2 s and 15 s) by means of the microwaves output by the microwave generating device 6. The number of parameter configurations $S_q$ set previously during the course of the method is denoted by the index q. At the start, therefore, q=1. The first parameter configuration $S_1$ may be predetermined or selected randomly or pseudo-randomly.

After the expiration of the time period Δt in a third partial step S0-3 an initial temperature distribution $<V_p=0>$ of the food G is determined by means of the thermal camera.

The temperature distribution $<V_p>$ of the food G is a segmented temperature distribution such that it has different sub-regions respectively with uniform temperature values. For example, the image recorded by the thermal imaging camera may be divided into image segments of a specific edge length or specific number of pixels. The value represented by a segment is a constant temperature value for this segment and may be determined, for example, by averaging the pixel values contained in the respective segment. In an extreme case, the segments correspond to individual pixels, i.e. the temperature distribution of the food used for carrying out the method is a pixel-based temperature distribution. Hereinafter it should be assumed by way of example that the temperature distribution $<V_p>$ of the food G is divided into k segments $V_{p;i}$ where i=1, . . . , k, i.e. $<V_p>=<V_{p:1}; \ldots ; V_{p:k}>$ applies.

In a method step S1 the microwave device is operated for the predetermined time period Δt with a q-th parameter configuration $S_q$ where q≤p in order to treat food G located in the cooking chamber with microwaves. If step S1 is carried out for the first time after the initial step S0 and/or step S1 immediately follows the initial step S0, the following applies p=q=1. Since the parameter configuration $S_q$ may be selected from a group of maximum p parameter configurations, therefore, when step S1 is carried out for the first time, initially only the parameter configuration S1 set in step S0-2 is present.

In a step S2 after the expiration of the time period Δt a p-th temperature distribution $<V_p>$ of the food G is determined by means of the thermal camera. The determination of the temperature distribution may comprise an averaging of temperature measured values of individual pixels assigned to the respective segment $V_{p;i}$ if the segments $V_{p;i}$ comprise more than one pixel.

In a simplified example where k=4 segments, the temperature distribution $<V_p>$ in the iteration step p may look as follows:

$$< V_p >= \begin{bmatrix} 45 & 48 \\ 46 & 45 \end{bmatrix}$$

wherein the individual temperature values $V_{p,i}$ are specified in degrees Celsius.

In a step S3 a query is made as to whether the temperature distribution $<V_p>$ measured in step S2 has reached or exceeded the target temperature value $T_{target}$. If yes ("Y") the method is terminated in step S4. The condition or query in step S3 may generally be written as $<V_p>\geq T_{target}$ and in one example expressed as $$\max\{V_{p,i}\}\geq T_{target}$$

i.e. the method is terminated when at least one segment $V_{p,i}$ of the temperature distribution $<V_p>$ has exceeded the target temperature. Alternatively, the method may be terminated, for example, when a specific number of segments $V_{p,i}$ a specific percentage of segments $V_{p,i}$ or all of the segments $V_{p,i}$ has or have reached or exceeded the target temperature value $T_{target}$. The last condition may also be denoted as min $\{V_{p,i}\}\geq T_{target}$.

If the condition is not fulfilled in the query carried out in step S3 ("N") the process branches to step S5.

In step S5 the previously measured p-th temperature distribution $<V_p>$ is compared and/or combined with the previously measured temperature distribution $<V_{p-1}>$, and a specific pattern of change $<E(S_q)>$ for the currently set parameter configuration $S_q$ is calculated therefrom and this pattern of change $<E(S_q)>$ is then stored. This may be carried out, in particular, such that the temperature distributions $<V_{p-1}>$ and $<V_p>$ are compared in segments, i.e. corresponding segments of the two temperature distributions $<V_{p-1}>$ and $<V_p>$ with the same index i are combined with one another.

Specifically the pattern of change $<E(S_q)>$ may be calculated as a difference between the two temperature distributions $<V_{p-1}>$ and $<V_p>$, i.e. $<E(S_q)>=<V_p>-<V_{p-1}>$ is determined. The pattern of change $<E(S_q)>$ is thus also divided into k segments E $(S_q)$. In this case, in particular, segments $V_{p;i}$ and $V_{p-1;i}$ with the same index i are subtracted from one another, i.e. for all segments $E_i$, $(S_q)$ the operation is calculated as $$E_i(S_q)=V_p-V_{p-1}$$

The pattern of change $<E(S_q)>$ corresponds to a segmented distribution of the temperature differences between the two chronologically following temperature distributions $<V_{p-1}>$ and $<V_p>$ and thus substantially to an effect on the food G produced by this set parameter configuration $S_q$.

Relative to the above example, when $$< V_{p-1} >= \begin{bmatrix} 44 & 42 \\ 44 & 43 \end{bmatrix}$$

applies, for example, this results in a pattern of change $E_q=<E(S_q)>$ according to $$E_q = \begin{bmatrix} 45 & 48 \\ 46 & 45 \end{bmatrix} - \begin{bmatrix} 44 & 42 \\ 44 & 43 \end{bmatrix} = \begin{bmatrix} 1 & 6 \\ 2 & 2 \end{bmatrix}$$

The pattern of change $<E(S_q)>$ may also be specified, for example, as the temperature increase per time unit, apart from the temperature difference. The physical unit may in this case be specified, for example, as ° C./s.

In a step S6 one respective assessment value $B(S_q)$ is calculated for all patterns of change $<E(S)>=\{<E(S_q)>\}$ stored hitherto. When step S5 is first carried out, only the pattern of change $<E(S_1)>$ is present, so that only one assessment value $B(S_1)$ is then calculated.

The assessment value $B(S_q)$ is based in this case on a respective combination of the temperature distribution $<V_p>$ and a prediction pattern $<V'_p>$ with a target pattern <Z> for the food G. In this case the prediction pattern $<V'_p>$ corresponds to a segmented temperature distribution which corresponds to a temperature distribution which approximates or is closer to the next iteration step, if the parameter configuration $S_q$ were to be used.

The prediction pattern $<V'_p>$ may be calculated for a specific pattern of change $<E(S_q)>$, for example segmented, according to $$<V'_p>=<V_p>+<E(S_q)>$$

In the above example in this case $$< V'_p >= \begin{bmatrix} 46 & 54 \\ 48 & 47 \end{bmatrix}$$

would result.

The assessment value $B(S_q)$ represents a quality or an amount of a likely deviation of the prediction pattern $<V'_p>$ to a target pattern <Z> for the food G. The "best" calculation value $B(S_q)$ specifies that when the microwave device is set to the parameter configuration $S_q$ associated therewith, this is likely to be closer to the target pattern <Z> than with other parameter configurations $S_q$ already set or tested. The assessment value $B_q=B(S_q)$ may also be denoted as the "prediction quality".

Specifically the assessment value $B(S_q)$ may be calculated according to $$B_q=\Sigma(|<Z^*>-<V_p>|^d-|<Z^*>-<V'_p>|^d)$$

which corresponds in the segmented representation of the calculation $$B_q = \sum_{i=1}^{k}\left(|Z_i^* - V_{p,i}|^d - \left|Z_i^* - V'_{p,i}\right|^d\right)$$

where k corresponds to the number of segments i. In this case the closer it is to the target distribution <Z>, the greater the value of $B_q$.

The value of the exponent d is a preset value which determines how much consideration is given to the deviations from the target distribution <Z>. Where d>1 it follows that the assessment value B prefers such patterns of change $<E(S_q)>$ which compensate for large differences between the current temperature distribution $<V_p>$ and the target distribution <Z>.

In the above example, if a uniform temperature distribution where $T_{Target}$=80° C. were to be desired as a (standardized) target distribution <Z>, i.e. the following would apply $$<Z>=\begin{bmatrix}1 & 1\\ 1 & 1\end{bmatrix}$$

where d=1 and with an average value D of Ø ($<V_p>$) where $$D = \frac{(45+48+46+45)}{4}{}^\circ\text{ C.} = 46^\circ\text{ C.}$$

$$<Z^*>=\begin{bmatrix}46 & 46\\ 46 & 46\end{bmatrix}{}^\circ\text{ C.}$$

follows and an assessment value $$\begin{aligned}B(S_q) &= (|1*46-45|-|1*46-46|)+(|1*46-48|-|1*46-54|)+\\ &(|1*46-46|-|1*46-48|)+(|1-46-45|-|1*46-47|)=\\ &(1-0)+(2-8)+(0-2)+(1-1)=1-6-2+0=7\end{aligned}$$

results therefrom.

For comparison, therefore, the assessment value $B_3$ of a further older heating pattern $<E_j>$ where j<q, is determined:

$$E_j=\begin{bmatrix}3 & 1\\ 1 & 2\end{bmatrix}$$

$$\begin{aligned}B(S_j) &= (|1*46-45|-|1*46-48|)+(|1*46-48|-|1*46-49|)+\\ &(|1*46-46|-|1*46-47|)+(|1-46-45|-|1*46-47|)=\\ &(1-2)+(2-3)+(0-1)+(1-1)=1-1-1+0=-3\end{aligned}$$

As a result the pattern of change $<Ej>\equiv<E(S_j)>$ would be selected, since $B(S_j)>B(S_q)$ applies. The comparison of the patterns $<V'_p(E_q)>$, which is produced by applying $<E_q>\equiv<E(S_q)>$, and $<V'_p(E_j)>$, which is produced by applying $<E(S_3)>$, shows that the result $<V'_p(E_j)>$ is more uniform:

$$<V'_p(E_q)>=\begin{bmatrix}46 & 54\\ 48 & 47\end{bmatrix}\quad <V'_p(E_j)>=\begin{bmatrix}48 & 49\\ 48 & 47\end{bmatrix}$$

In a variant of the method, an average value D' may be used instead of $$D = \text{Ø}(<V_k>) = \frac{1}{k}\sum_{i=1}^{k}V_{p,i}$$

said average value already taking into consideration the heating to be anticipated when applying a pattern of change $<E(S_q)>$, which may be represented in the formula $$D' = \text{Ø}(<Vk>+<E(S_q)>) = \frac{1}{k}\sum_{i=1}^{k}(V_{p,i}+E_i(S_q))$$

D and D' may be specified in ° C.

In a further variant, the average heating of a pattern of change $<E(S_q)>$ may also be considered, in particular, in comparison with the average heating of all of the patterns of change.

In one development, patterns of change which do not have a certain minimum threshold value in their average heating are excluded. Thus the method may be prevented from being incorrectly controlled, since in the borderline case <E(Sq)>=<0> where $$V_{p,i}=V'_{p,i}\text{ and for }B_q=\Sigma_{i=1}^{k}(|Z^*_i-V_{p,i}|^d-|Z^*_i-V'_{p,i}|^d)$$
$$\text{thus }B_q=0.$$

applies.

In a step S7 the parameter configuration $S_q$ which is likely to be closest to the target distribution <Z> is set from the available group of parameter configurations $\{S_q\}$ already previously set at least once. This may be, in particular, the parameter configuration $S_q$ which corresponds to the largest assessment value $B(S_q)$.

In a step S8 an associated (p-th) scalar quality value $Q_p<V_p>$, <Z>) is also calculated for the p-th temperature distribution $<V_p>$, said quality value measuring a deviation of the current measured p-th temperature distribution $<V_p>$ from the target distribution <Z> or a degree of similarity of the currently measured p-th temperature distribution $<V_p>$ to the target distribution <Z>. For example the quality value $Q_p$ may be calculated according to $$Q_p = \sqrt{\frac{1}{k}\sum_{i=1}^{k}(D\cdot<Z>-<V_p>)^2} = \sqrt{\frac{1}{k}\sum_{i=1}^{k}(D\cdot Z_i - V_{p,i})^2}$$

wherein D corresponds to the average value of all segments $V_{p,i}$ which may be calculated, for example, according to $$D = \text{Ø}(<V_k>) = \frac{1}{k}\sum_{i=1}^{k}V_{p,i}$$

In this case D is in a value range 0≤D≤1. The smaller the value of $Q_p$, the closer $<V_p>$ is to <Z>. Similarly $Q_{p,norm}$ may also be used instead of $Q_p$.

In the case of a uniform target temperature distribution (which may be expressed, for example, as $\langle Z\rangle$=constant) $Q_p$ corresponds to the standard deviation. $Q_p$ may also be denoted, therefore, in the above practical embodiment as the “modified standard deviation”

In a variant, in this calculation step the temperature distribution $\langle V^*_p\rangle$ which is standardized to the maximum temperature value $V_{p,max}$ of the segments $V_{p,i}$ is advantageously used with its segments $V^*_{p,i}$=e.g. $V_{p,i}/V_{p,max}$ instead of the temperature distribution $\langle V_p\rangle$, and at the same time the average value D is also calculated from the standardized segments $V^*_{p,i}$.

In step S9, which may also be optional, it is monitored whether $Q_p \le Q_{Ziel}$ applies, i.e. whether the quality value $Q_p$ has reached a predetermined target value $Q_{target}$, i.e. whether the target distribution $\langle Z\rangle$ or $\langle Z^*\rangle$ has been reached in a sufficiently accurate manner. If yes (“Y”) the process branches back to step S1.

If the quality value $Q_p$ has not reached the at least one criterion (“N”), the process branches to step S10.

In step S10 a query is made as to whether the quality value $Q_p$ is better or worse than the quality value $Q_{p-1}$ ($\langle V_{p-1}\rangle$, $\langle Z\rangle$) calculated for the previous (p−1)-th step, which is symbolized by the expression “$Q_p \updownarrow Q_{p-1}$?”. If yes (“Y”) whilst maintaining the current parameter configuration $S_q$, the process branches back to step S1. In this case the iteration index p is incremented by the value of one according to p:=p+1.

If in step S10 the quality value $Q_p$ is worse than the quality value $Q_{p-1}$ (“N”) (i.e. the correspondence with the target distribution $\langle Z\rangle$ for the p-th execution is worse than in the previous (p−1)-th execution), in a step S11 a new parameter configuration $S_{q+1}$ is set and then the process branches back to step S1. In this case the iteration index p is incremented by one according to p:=p+1 (“iterative branching back”). The new parameter configuration $S_{q+1}$ has hitherto not yet been set during the course of the method. It may be predetermined or randomly or pseudo-randomly selected. As a result, the number of group members of the group $\{S_q\}$ of parameter configurations $S_q$ increases by one.

The above-described method permits a targeted control of a heating distribution of food when using microwaves and/or HF radiation, with the assistance of data from a thermal imaging camera. Thus it is possible to implement with little effort an intelligent control of a microwave cooking appliance which is able to achieve the best possible cooking result dynamically and only relative to the current moment. Thus targeted temperature patterns and distributions may be set even in conventional microwave appliances, which hitherto was virtually excluded—and namely merely with the assistance of a single thermal camera and a stepper motor for the rotating antenna.

Naturally the present invention is not limited to the exemplary embodiment shown.

Thus the above method steps may also be carried out in different sequences or optionally also in parallel. For example, the sequence of steps S5 to S7 and S8 to S10 may be reversed, the steps S3 and S3 may be carried out directly before step S8 or afterward, etc.

The steps S7 and S8 may also be already carried out for the step p=1, if a quality value $Q_0$ is present, for example, since it has been calculated during the course of the initial step S0.

In step S10 it may additionally be required that the improvement of the quality value $Q_p$ relative to the quality value $Q_{p-1}$ of the previous iteration has to reach or exceed a specific minimum amount a, for example in the form of the condition $Q_p \le Q_{p-1} \cdot a$ where a<1, e.g. a=0.995, if a smaller value of Q means a better correspondence. The minimum amount a may be selected in an arbitrary manner but then fixed, or it may be dynamically adapted. Thus it may be advantageously prevented that quasi-static states occur in which the cooking progress is merely infinitesimal. If the condition is not fulfilled, the process branches to step S11. Step S10 may thus be configured such that the process only branches back directly to step S1 when the condition $Q_p<Q_{p-1}$ and also the condition $Q_p<Q_{p-1}\cdot a$ where a<1 are fulfilled.

If a different definition of $Q_p$ is used, this optionally requires an expedient adaptation. For example, the condition for a quality value $Q_p$, which is defined in the formula, is that its 870 numerical functional value rises when it is closer to the target distribution $\langle Z\rangle$, corresponding to $Q_p \ge Q_{p-1}\cdot a$, wherein a>1.

In a further, also generally useful, modification, step 10 may be carried out directly after step S7 (i.e. steps S8 and S9 are dispensed with). The quality assessment Q may thus be carried out predictively in the formula $Q=Q_p(\langle V_p\rangle+\langle E(S_q)\rangle, \langle Z\rangle)$ even before the parameter configuration $S_q$ is actually set. If the quality value $Q_p$ is smaller than the quality value $Q_{p-1}$, the parameter configuration $S_q$ is not used but a new parameter configuration $S_{q+1}$ is sought and then the process branches back to step S1. This has the advantage that a parameter configuration $S_q$ is not set since it would not improve the overall result, although it represents the best of the currently available options, based on the results of the assessment function $B_q$.

It may also be considered that due to the variability of the food and the overall system it is possible that patterns of change $\langle E(S_q)\rangle$ which were determined in the past are no longer valid. Generally it may then be advantageous if patterns of change $\langle E(S_q)\rangle$ no longer used over a longer period of time (for example after one minute) are dynamically updated and/or sporadically monitored for their validity. This may be carried out, for example, by an intermediate step in which the microwave appliance 1 is set to the associated parameter configuration $S_q$ and then after the food is handled with this parameter configuration $S_q$ the associated pattern of change $\langle E(S_q)\rangle$ is calculated and is stored instead of the old pattern of change $\langle E(S_q)\rangle$.

Moreover the step sequence S3, S4 may be exchanged for the step sequence S1, S2. Then the process branches back to S3 instead of step S1.

Generally the method may be carried out with standardized or non-standardized values and distributions.

Generally, “one” etc. may be understood as a singular or a plurality, in particular in the sense of “at least one” or “one or more”, etc. provided this is not explicitly excluded, for example by the expression “exactly one”, etc.

A specified number may also encompass exactly the specified number and also a general tolerance range as long as this is not explicitly excluded.

The invention claimed is:

1. A method for operating a household cooking appliance, comprising:

a data processing device for operating the household cooking appliance by:

a) operating a food handling device for treating food located in a cooking chamber of the household cooking appliance, wherein the food is able to be treated locally differently by at least two parameter configurations, in a p-th iteration step, where p≥1, for a predetermined time period with a q-th parameter configuration, where q≤p, b) in response to the predetermined time period has expiring, determining with a sensor directed into the cooking chamber a p-th measured value distribution of a surface property of the food, c) comparing the p-th measured value distribution with a (p−1)-th measured value distribution recorded before step a), and calculating therefrom a pattern of change and storing the pattern of change, d) calculating for each stored pattern of change a respective assessment value which represents a difference between a deviation of a target distribution from the measured value distribution and a deviation of the target distribution from a prediction pattern, with the prediction pattern representing a superimposition of the measured value distribution with the respective pattern of change, e) setting a parameter configuration of the at least two parameter configurations having a corresponding assessment value that satisfies at least one predetermined criterion, f) calculating for the p-th measured value distribution a quality value that specifies a deviation of the p-th measured value distribution from a target measured value distribution, and g) based on the quality value having a smaller deviation from the target measured value distribution than a (p−1)-th quality value, returning to step a) while maintaining a current parameter configuration, and h) based on the quality value having a larger deviation from the target measured value distribution than the (p−1)-th quality value, setting a new parameter configuration, and thereafter returning to step a).

2. The method of claim 1, wherein the measured value distribution and the target measured value distribution are temperature distributions.

3. The method of claim 2, wherein the food handling device comprises a microwave device for introducing microwaves into the cooking chamber to treat the food in the cooking chamber, wherein the at least two parameter configurations of the microwave device comprise different field distributions of the microwaves in the cooking chamber, the sensor comprises an infrared sensor, the measured value is a temperature, and the surface property is a surface temperature of the food.

4. The method of claim 1, wherein the measured value distribution, the target measured value distribution and the pattern of change are each segmented distributions having k segments, and wherein the target measured value distribution represents the target distribution relative to the p-th measured value distribution and to an average value D of the k segments of the p-th measured value distribution.

5. The method of claim 1, wherein the method is terminated in response to the quality value reaching a predetermined criterion, or in response to the food reaching a predetermined target value.

6. The method as claimed in claim 5, wherein the predetermined criterion is a target quality value.

7. The method of claim 5, wherein the food has reached the predetermined target value based on the predetermined target value being less than a maximum of the measured value distribution or based on the predetermined target value being less than a minimum of the measured value distribution.

8. The method of claim 4, wherein the pattern of change $<E(S_q)>$ in each segment is calculated as the difference between the p-th measured value distribution $<V_p>$ and the (p−1)-th measured value distribution $<V_{p-1}>$ for that segment according to $$<E(S_q)>=<V_p>-<V_{p-1}>.$$

9. The method of claim 4, wherein the assessment value Bq is calculated according to $$B_q=\Sigma(|<Z^*>-<V_p>|^d-|<Z^*>-<V'_p>|^d)$$

with $<Z^*>$ representing the target measured value distribution, $<V_p>$ representing the p-th measured value distribution, and $<V'_p>$ representing the prediction pattern) $<V'_p>=<V_p>+<E(S_q)>$, with representing the pattern of change $<E(S_q)>$ in each segment, and with d being an exponential factor.

10. The method of claim 4, wherein the quality value $Q_p$ is calculated according to $$Q_p = \sqrt{\frac{1}{k}\sum(D\cdot <Z> - <V_p>)^2}$$

where $<Z>$ represents the target distribution, $<V_p>$ represents the $p-$th measured value distribution, and $D$ represents an average value of segments of the p−th measured value distribution $<V_p>$ such that $D=\emptyset(<V_k>)$.

11. The method of claim 3, wherein the parameter configuration comprises at least one operating parameter of the microwave device selected from the group consisting of a rotational angle of a rotatable antenna;

a vertical position of the rotatable antenna;

a spatial position of a microwave reflector;

a microwave frequency; and relative phases between different microwave generators.

12. The method of claim 3, wherein the infrared sensor comprises a thermal imaging camera recording a pixel-based thermal image.

13. The method of claim 1, wherein the measured value distribution is determined from an image from the cooking chamber recorded by the sensor.

14. A household cooking appliance comprising a cooking chamber, a food handling device for handling food located in the cooking chamber with a plurality of parameter configurations, wherein the food is able to be treated locally differently by at least two parameter configurations, a sensor which is directed into the cooking chamber for determining distributions of a surface property of the food, and a data processing device for operating the household cooking appliance by:

a) operating the food handling device in a p-th iteration step, where p≥1, for a predetermined period of time with a q-th parameter configuration, where q≤p, b) in response to the predetermined period of time expiring, determining with a sensor directed into the cooking chamber a p-th measured value distribution of a surface property of the food, c) comparing the p-th measured value distribution with a (p−1)-th measured value distribution recorded before step a), and calculating therefrom a pattern of change and storing the pattern of change, d) calculating for each stored pattern of change a respective assessment value which represents a difference between a deviation of a target distribution from the measured value distribution and a deviation of the target distribution from a prediction pattern, with the prediction pattern representing a superimposition of the measured value distribution with the respective pattern of change, e) setting the parameter configuration having a corresponding assessment value that satisfies at least one predetermined criterion, f) calculating for the p-th measured value distribution a quality value that specifies a deviation of the measured value distribution from the target measured value distribution, and g) based on the quality value having a smaller deviation from the target measured value distribution than the (p−1)-th quality value, returning to step a) while maintaining a current parameter configuration, and h) based on the quality value having a larger deviation from the target measured value distribution than the (p−1)-th quality value, setting a new parameter configuration, and thereafter returning to step a).

15. The household cooking appliance of claim 14, wherein the measured value distribution and the target measured value distribution are temperature distributions.

16. The household cooking appliance of claim 14, wherein the food handling device comprises a microwave device for introducing microwaves into the cooking chamber, wherein the at least two parameter configurations of the microwave device comprise different field distributions of the microwaves in the cooking chamber, the sensor comprises an infrared sensor, the measured value is a temperature, and the surface property is a surface temperature of the food.

17. The household cooking appliance of claim 14, wherein the data processing device terminates treatment of the food located in the cooking chamber in response to the quality value reaching a predetermined criterion, or in response to the food reaching a predetermined target value.

18. The household cooking appliance of claim 17, wherein the predetermined criterion comprises a target quality value.

19. The household cooking appliance of claim 17, wherein the food has reached the predetermined target value based on the predetermined target value being less than a maximum of the measured value distribution or based on the predetermined target value being less than a minimum of the measured value distribution.

* * * * *